United States Patent
Feigel et al.

(10) Patent No.: US 6,315,370 B1
(45) Date of Patent: Nov. 13, 2001

(54) ELECTRONICALLY CONTROLLABLE BRAKE OPERATING SYSTEM

(75) Inventors: Hans-Jörg Feigel, Rosbach; Manfred Rüffer, Sulzbach; Lothar Schiel, Hofheim, all of (DE)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/051,383
(22) PCT Filed: Oct. 10, 1996
(86) PCT No.: PCT/EP96/04398
§ 371 Date: Aug. 7, 1998
§ 102(e) Date: Aug. 7, 1998
(87) PCT Pub. No.: WO97/14593
PCT Pub. Date: Apr. 24, 1997

(30) Foreign Application Priority Data
Oct. 18, 1995 (DE) .............................. 195 38 794

(51) Int. Cl.⁷ .................................................. B60T 8/42
(52) U.S. Cl. .............................. 303/115.2; 303/113.4
(58) Field of Search .................... 303/115.2, 113.1, 303/113.4, 114.1, 114.2, 115.1, 116.1, 116.2, 116.4, 115.4, DIG. 3, DIG. 4, 15, 155

(56) References Cited

U.S. PATENT DOCUMENTS

| | | | |
|---|---|---|---|
| 3,948,568 | * 4/1976 | Leiber | 303/15 |
| 4,089,624 | * 5/1978 | Nichols et al. | 417/362 |
| 4,276,003 | * 6/1981 | Perkins et al. | 417/415 |
| 4,480,877 | * 11/1984 | Resch | 303/115.4 |
| 4,701,854 | * 10/1987 | Matsuda | 303/113.1 |
| 4,708,404 | * 11/1987 | Seibert et al. | 303/114.1 |
| 4,927,213 | * 5/1990 | Burgore et al. | 303/116.4 |
| 5,026,124 | * 6/1991 | Resch | 303/116.1 |
| 5,125,724 | * 6/1992 | Steiner | 303/115.4 |
| 5,234,263 | 8/1993 | Haerr et al. | 303/115.2 |
| 5,258,912 | 11/1993 | Ghoneim et al. | |
| 5,261,730 | * 11/1993 | Steiner et al. | 303/115.4 |
| 5,454,631 | 10/1995 | Frieling et al. | |
| 5,531,509 | * 7/1996 | Kellner et al. | 303/155 |
| 5,620,241 | * 4/1997 | Burgdorf | 303/113.5 |
| 5,752,751 | * 5/1998 | Nakaura et al. | 303/122.06 |
| 5,758,930 | * 6/1998 | Schiel et al. | 303/113.4 |
| 5,836,659 | * 11/1998 | Feigel et al. | 303/115.2 |

FOREIGN PATENT DOCUMENTS

| | | |
|---|---|---|
| 3424912 | 1/1986 | (DE) . |
| 3812830 | 7/1989 | (DE) . |
| 3922861 | 1/1991 | (DE) . |
| 3124755 | 2/1992 | (DE) . |
| 4125902 | 2/1992 | (DE) . |
| 4102497 | 5/1992 | (DE) . |
| 4310061 | 9/1994 | (DE) . |
| 4335769 | 12/1994 | (DE) . |
| 4343386 | 6/1995 | (DE) . |
| 4401524 | 8/1995 | (DE) . |
| 4415438 | 11/1995 | (DE) . |
| 4426682 | 2/1996 | (DE) . |
| 41 40 119 | * 6/1993 | (DE) ............... 303/116.4 |
| 0413949 | 2/1991 | (EP) . |
| 0420484 | 4/1991 | (EP) . |

* cited by examiner

*Primary Examiner*—Robert J. Oberleitner
*Assistant Examiner*—Thomas J. Williams
(74) *Attorney, Agent, or Firm*—Rader, Fishman & Grauer PLLC

(57) ABSTRACT

An electronically controllable brake actuation system for automotive vehicles includes a simulator interacting with the master brake cylinder, a pressure source drivable by an electronic control unit and by which wheel brakes of the vehicle are pressurizable, the wheel brakes being connectable to the master brake cylinder by at least one hydraulic connection that is closable by separating valves, a device for the identification of the driver's wish for deceleration, each one inlet and outlet valve connected upstream of the wheel brakes, and wheel sensors sensing the rotational behavior of the vehicle wheels.

To improve the meterability of braking pressure of a system of the above type, especially in the range of low pressure values, the pressure source is configured as at least one continuously adjustable piston-and-cylinder assembly having a pressure chamber which is connectable to the master brake cylinder and the wheel brakes.

9 Claims, 3 Drawing Sheets

ELECTRONICALLY CONTROLLABLE BRAKE OPERATING SYSTEM

BACKGROUND OF THE INVENTION

The present invention relates to an electronically controllable brake actuation system.

A brake actuation system of this type is disclosed in German patent application No. 31 24 755. The pressure source of the prior art brake actuation system includes a pump, a hydraulic accumulator and a pressure fluid supply reservoir. The function of the separating valves and the inlet and outlet valves is performed by multi-position valves or four-way/four-position directional control valves having inlet ports which are connected to the pressure side of the pump or the accumulator, the pressure fluid supply reservoir and each one pressure chamber of the dual-circuit master brake cylinder. The wheel brakes are connected to the outlet ports. During independent braking or pressure increase, the four-way/four-position directional control valve is switched to its first operating position where the wheel brakes are separated from the master brake cylinder and connected to the pressure source. A phase where the pressure is maintained constant is achieved in a second operating position where the wheel brakes are isolated from the master brake cylinder and from the pressure source. Pressure decrease is effected in a third operating position where a connection is provided between the wheel brakes and the unpressurized pressure fluid supply reservoir.

Apart from the comparatively high costs incurred by the use of the sophisticated pressure source, the meterability of braking pressure in the prior art brake actuation system is a disadvantage, especially in the low-pressure range, which is due to the use of the four-way/four-position directional control valves.

Therefore, an object of the present invention is to improve upon an electronically controllable brake actuation system of the above-mentioned type to such effect as to virtually eliminate the shortcomings mentioned with respect to ABS control. More particularly, the objective is to considerably improve the meterability of braking pressure in the low-pressure range and to additionally reduce the total effort and structure.

SUMMARY OF THE INVENTION

According to the present invention, this object is achieved because the pressure source is configured as at least one continuously adjustable piston-and-cylinder assembly having a pressure chamber which is connectable to the master brake cylinder and the wheel brakes. It is achieved by these provisions that normal braking operations are carried out similarly by way of the piston-and-cylinder assembly, and the pressure-retaining phases are achieved in an energy-saving way by operation of the normally open (NO) inlet valves. The speed of braking pressure increase can be augmented by a retarded operation of the separating valves.

The present invention will be explained in detail in the following description of three embodiments, making reference to the accompanying drawings.

DETAILED DESCRIPTION OF THE INVENTION

Figure 1:
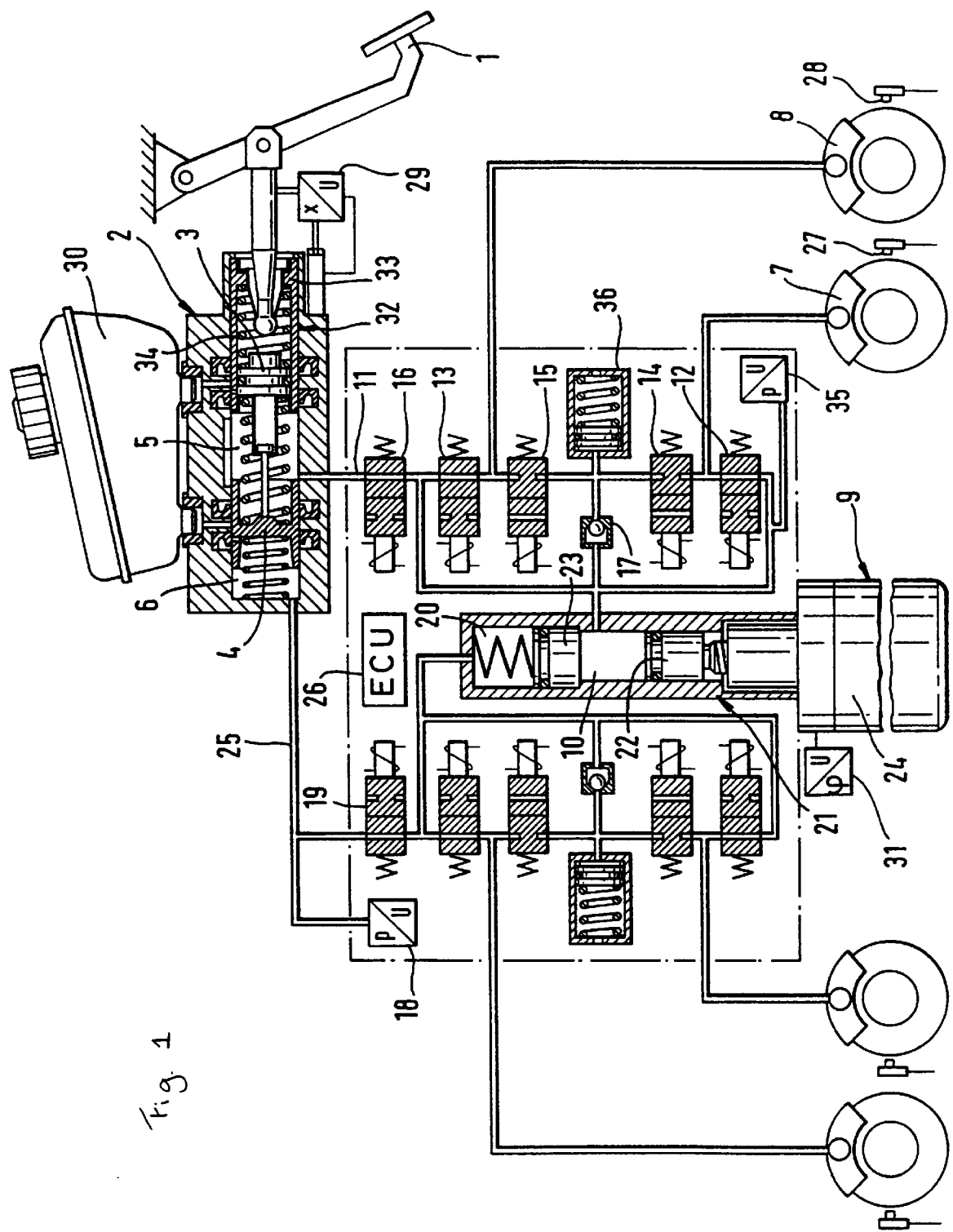
FIG. 1 is a wiring diagram of a first design of the brake actuation system of the present invention.

The electronically controllable brake actuation system of the present invention shown in the drawings includes a dual-circuit master brake cylinder or tandem master cylinder 2 operable by an actuating pedal 1. The tandem master cylinder 2 has pressure chambers 5, 6 separated from each other, confined by two pistons 3, 4 and being in connection to an unpressurized pressure fluid supply reservoir 30. The first pressure chamber (primary pressure chamber) 5 is connected to a first pressure chamber 10 of a piston-and-cylinder assembly 9 by way of a closable first hydraulic line 11. For example, a wheel brake 7 associated with the front axle and a wheel brake 8 associated with the rear axle are connected to the assembly 9 which preferably has a dual-circuit configuration. Line 11 is closed by way of a first separating valve 16. An electromagnetically operable, preferably normally open (NO) inlet valve 12, 13 is inserted into each of the line portions between the pressure chamber 10 and the wheel brakes 7, 8. Further, a low-pressure accumulator 36 is connected to the pressure chamber 10 by way of a non-return valve 17 which opens towards the pressure chamber 10. Accumulator 36 is connectable to the wheel brakes 7, 8 by way of each one electromagnetically operable, preferably normally closed (NC) outlet valve 14, 15.

The second pressure chamber 6 of the master brake cylinder 2, to which a pressure sensor 18 can be connected, is connected to a second pressure chamber 20 of the piston-and-cylinder assembly 9, on the one hand, and to the other pair of wheel brakes (not shown), on the other hand, by way of a hydraulic line 25 which is closable by a second separating valve 19. Because the configuration of the hydraulic circuit connected to the second pressure chamber 6 of the master brake cylinder 2 is identical with the circuit described with respect to the first brake circuit 11, there is no need for discussing it in the following text.

The above-mentioned piston-and-cylinder assembly 9 which is used as an independent assist pressure source, in turn, includes a tandem-design hydraulic cylinder 21, wherein two pistons 22, 23 are slidable which confine the above-mentioned pressure chambers 10, 20. The first piston 22 is drivable by a preferably reversible direct-current motor 24.

An electronic control unit 26 is used for the joint actuation of the direct-current motor 24 and the electromagnetic valves 12 to 15, 16 and 19. Output signals of an actuating travel sensor 29, interacting with the actuating pedal 1, and of the above-mentioned pressure sensor 18 are sent as input signals to the control unit 26, the signals permitting identification of the driver's wish for deceleration. However, other means, such as a force sensor sensing the actuating force on the actuating pedal 1, may also be used for the identification of the driver's wish for deceleration. Output signals of wheel sensors, representative of the driving speed of the vehicle, are sent as further input variables to the electronic control unit 26. The wheel sensors associated with the wheel brakes 7, 8 have been assigned reference numerals 27, 28. Further, there is provision of an angle-of-rotation/voltage converter 31 which senses the angular position of the rotor of the d-c motor 24 and thereby permits indirectly determining the position of the pistons 22, 23 of the piston-and-cylinder assembly 9.

As can be seen in the embodiment of FIG. 1, a simulator 32 is interposed in terms of effect between the actuating pedal 1 and the master brake cylinder 2. Simulator 32 includes a sleeve 33, which is in a force-transmitting connection to the actuating pedal 1 and forms a component of the first master cylinder piston 3, and a simulator spring 34 arranged inside the sleeve 33. The simulator spring 34 is axially supported on the piston 3, on the one hand, and on the sleeve 33, on the other hand.

The operation of the brake actuation system shown in the embodiment of FIG. 1 in the drawing is as follows: when a braking operation is initiated by depression of the brake actuating pedal 1, the actuating condition is identified by the actuating travel sensor 27 and advised to the electronic control unit 26. Control signals of control unit 26 cause change-over of the valves 16 and 19 and, thereby, separation of the master cylinder pressure chambers 5, 6 from the pressure chambers 10, 20 of the piston-and-cylinder assembly 9. The driver's wish for deceleration is signalled a second time by the pressure sensor 18, or a second preset standard of an actual pressure value is sent to the electronic control unit 26 which produces actuating signals for the d-c motor 24. Motor 24 initiates displacement of the pistons 22, 23 in the actuating direction and, thus, pressure increase in the wheel brakes 7, 8, 7', 8'. The adjustment of nominal values and actual values is performed by a second pressure sensor 35 which is connected to the first pressure chamber 10 of the piston-and-cylinder assembly 9. The usual pedal feel which can be sensed by the driver during a braking operation is ensured by the compression of a simulator spring 34.

Pressure is reduced by the return movement of the pistons 22, 23, possibly by an active reversal of the direction of rotation of the direct-current motor 24.

An excessive volume of pressure fluid can be stored in the low-pressure accumulators 36 in ABS control operations. In the wheel being controlled, pressure variation occurs by way of the inlet and outlet valves 12, 13 and 14, 15, respectively, and the low-pressure accumulator 36 can be evacuated by way of the non-return valve 17 due to the resetting movement of the piston-and-cylinder assembly 9.

The separating valves 16, 19 are closed in a traction slip control operation or a driving stability control operation. The necessary braking pressure is generated by the piston-and-cylinder assembly 9. A pressure-retaining phase is achieved by change-over of the (NO) inlet valve 12 or 13. The pressure can be decreased by change-over of the normally closed (NC) outlet valve 14, 15 or by operation of the closed (NC) inlet valve 12, 13 and a simultaneous reduction of the current delivered to the d-c motor 24. The above-mentioned non-return valve 17 permits a return flow of the pressure fluid in the direction of the piston-and-cylinder assembly 9 after or even during control.

Figure 2:
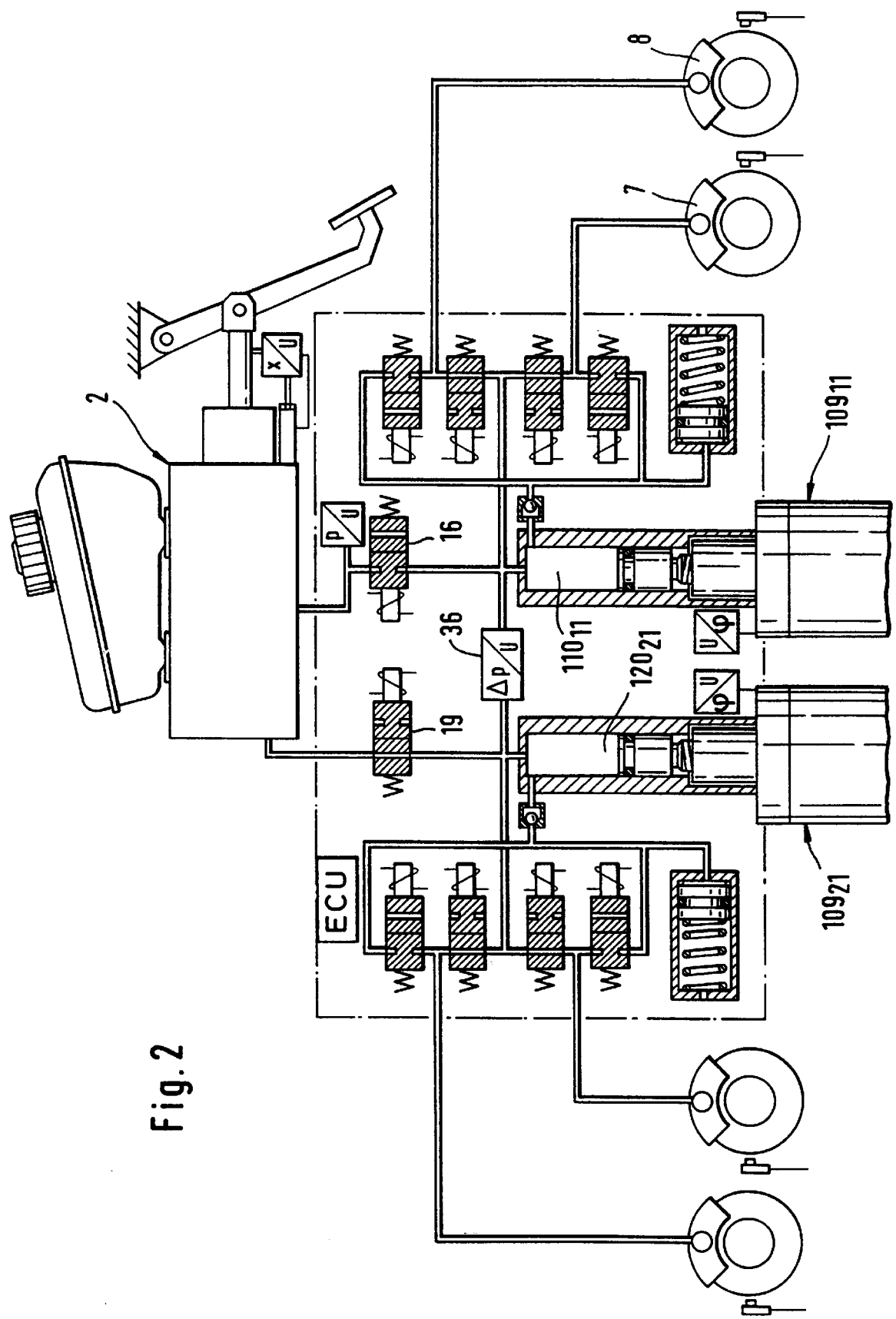
FIG. 2 is a wiring diagram of a second design of the brake actuation system of the present invention.
Figure 3:
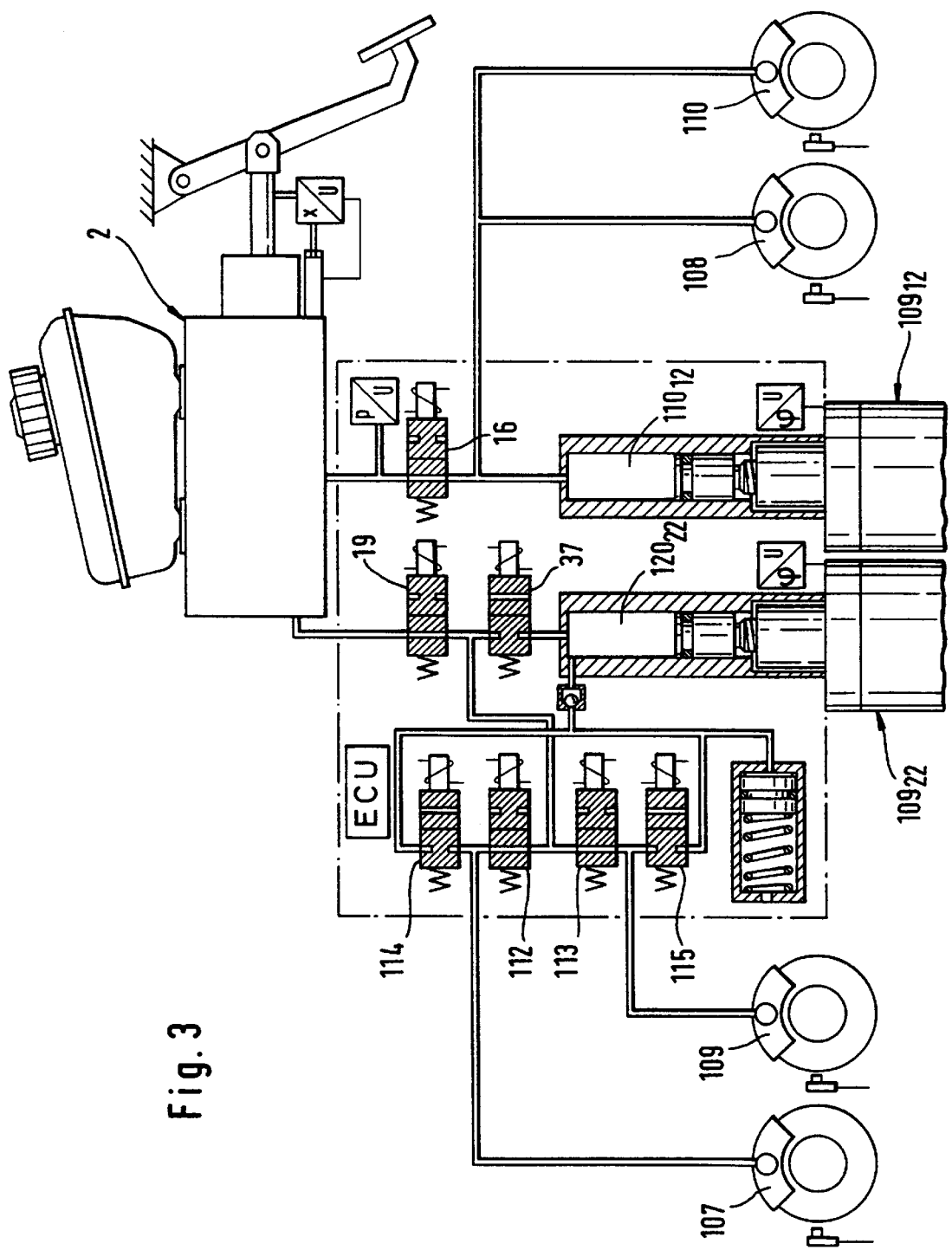
FIG. 3 is a wiring diagram of a third design of the brake actuation system of the present invention.

In the second and third embodiment of the object of the present invention shown in FIGS. 2 and 3, two one-circuit piston-and-cylinder assemblies $109_{11}$, $109_{21}$, $109_{12}$, $109_{22}$ are used instead of the dual-circuit piston-and-cylinder assembly 9 mentioned with respect to FIG. 1. The pressure chambers $110_{11}$, $110_{12}$ and, respectively, $120_{21}$, $120_{22}$ of the one-circuit piston-and-cylinder assemblies are connected to the pressure chambers 5, 6 of the master brake cylinder 2 by way of the separating valves 16, 19, on the one hand, and to each one pair of wheel brakes, on the other hand.

The allotment of the brake circuits of the second embodiment shown in FIG. 2 corresponds to the brake circuit allotment of the first embodiment shown in FIG. 1 so that each one wheel brake 7, 8, 7', 8' associated with the front axle and the rear axle cooperates with each pressure chamber $110_{11}$, $120_{21}$ of the piston-and-cylinder assembly $109_{11}$, $109_{21}$. Preferably, a differential-pressure/voltage converter 36 is connected between the two pressure chambers $110_{11}$, $120_{21}$.

Preferably, the brake circuit allotment of the third embodiment shown in FIG. 3 is chosen so that the wheel brakes 108, 108' associated with the rear axle of the vehicle are connected to the pressure chamber $110_{12}$ of the first piston-and-cylinder assembly $109_{12}$, the wheel brakes being connected to the pressure chamber $110_{12}$ without the intermediary of the inlet and outlet valves. The wheel brakes 107, 107' associated with the front axle are connected to the pressure chamber $120_{22}$ of the second piston-and-cylinder assembly $109_{22}$ by way of each one inlet valve (112, 113) and one outlet valve (114, 115) (black-and-white circuit split-up). Another brake circuit allotment (diagonal split-up) is permitted by using an electromagnetically operable, normally closed (NC) valve 37 which is preferably interposed between the second separating valve and the pressure chamber $120_{22}$ of the second piston-and-cylinder assembly $109_{22}$.

The present brake system is also appropriate for the recuperation of brake energy in electric vehicles. In this case, the piston-and-cylinder assembly is actuated in the delay control circuit which also takes into account the effect of the brake torque produced by the vehicle drive. When the total torque which can be transmitted to the front axle is exceeded, the NO-valves are being closed and the braking pressure on the rear axle increased until the optimal brake force distribution is reached.

What is claimed is:

1. An electronically controllable brake actuation system for automotive vehicles with a plurality of wheels, which system includes a pedal-actuated master brake cylinder, a simulator interacting with the master brake cylinder, a plurality of wheel brakes connectable to the master brake cylinder by at least one hydraulic connection that is closable by a separating valve, a pressure source that is actuatable by an electronic control unit and by which the wheel brakes are pressurizable, a device for the identification of characteristics of a pedal actuation, wherein the pressure source is configured as at least one continuously adjustable piston-and-cylinder assembly having at least one pressure chamber to which preselected ones of the wheel brakes are connected by an intermediary of inlet valves, wherein the at least one piston-and-cylinder assembly is provided by at least one hydraulic cylinder having a piston which is operable by a reversible direct-current motor, wherein the pressure chamber of the at least one piston-and-cylinder assembly is connected to a low-pressure accumulator by way of a non-return valve which opens towards the pressure chamber, the preselected wheel brakes being connectable to the accumulator by way of an outlet valve, wherein the inlet valve is configured as an electromagnetically operable, normally open control valve, and the outlet valve is configured as an electromagnetically operable, nonnally closed control valve, wherein the pressure source is configured as a first and a second continuously adjustable one-circuit piston-and-cylinder assembly, each having a pressure chamber to which wheel brakes, each associated with a first or a second vehicle axle, are connected, wherein a normally closed valve is inserted into the connection between the wheel brakes associated with the first vehicle axle and the first piston-and-cylinder assembly, whereas the connection between the wheel brakes associated with the other vehicle axle is without an intermediary of switching valves.

2. An electronically controllable brake actuation system as claimed in claim 1, wherein there is a provision of a sensor which senses the travel of the piston.

3. An electronically controllable brake actuation system as claimed in claim 1, wherein the pressure accumulator is disposed in communication with said at least one piston-and-cylinder assembly and at least one inlet valve.

4. An electronically controllable brake actuation system as claimed in claim 1, wherein the master brake cylinder is operable by an actuating pedal, wherein the device for identifying the characteristics of a pedal actuation is provided by the combination of a travel sensor, which senses the actuating travel of the actuating pedal, and a pressure sensor which senses the hydraulic pressure that develops in the master brake cylinder.

5. An electronically controllable brake actuation system as claimed in claim 1, wherein the master brake cylinder is operable by an actuating pedal and the simulator is provided by a compression spring which is arranged in terms of effect between the actuating pedal and the master brake cylinder.

6. An electronically controllable brake actuation system as claimed in claim 1, wherein the device for identifying the characteristics of a pedal actuation is provided by two pressure sensors which each are connected to one pressure chamber of the master brake cylinder.

7. An electronically controllable brake actuation system as claimed in claim 1, wherein a means is provided to sense the position of the at least one piston of the at least one piston-and-cylinder assembly.

8. An electronically controllable brake actuation system as claimed in claim 1, wherein there is provision of a pressure sensor which senses the hydraulic pressure generated by the at least one piston-and-cylinder assembly.

9. An electronically controllable brake actuation system as claimed in claim 1, wherein a pressure switch is interposed between the master cylinder and the at least one piston-and-cylinder assembly.

* * * * *